United States Patent [19]

Wouters

[11] 4,099,487
[45] Jul. 11, 1978

[54] ROLLER WITH ADJUSTABLE LENGTH

[75] Inventor: Albert Paul Wouters, Deurne, Belgium

[73] Assignee: AGFA-Gevaert N.V., Mortsel, Belgium

[21] Appl. No.: 693,550

[22] Filed: Jun. 7, 1976

[30] Foreign Application Priority Data

Jun. 10, 1975 [GB] United Kingdom ............. 24879/75

[51] Int. Cl.² ........................................... G03G 13/16
[52] U.S. Cl. ............................... 118/651; 29/116 R; 29/125; 101/407 R
[58] Field of Search ............................ 29/116 R, 125; 101/407 R; 100/168, 176; 226/191; 118/648; 651

[56] References Cited

U.S. PATENT DOCUMENTS

| | | | |
|---|---|---|---|
| 492,072 | 2/1893 | Vaught | 29/116 R |
| 2,446,211 | 8/1948 | Clark | 29/116 R |
| 2,527,811 | 10/1950 | Hall | 29/125 X |
| 2,803,126 | 8/1957 | Meyer | 29/116 R X |
| 3,368,894 | 2/1968 | Matkan et al. | 118/651 X |
| 3,866,573 | 2/1975 | Szostak et al. | 118/651 |
| 3,893,413 | 7/1975 | Weiler | 118/651 X |

*Primary Examiner*—John P. McIntosh
*Attorney, Agent, or Firm*—William J. Daniel

[57] ABSTRACT

A pressure roller is composed of a plurality of roller sections, one of said roller sections having a greater diameter than the residual ones. All sections are carried by a common shaft, but the sections having a smaller diameter are eccentrically located on the shaft and freely rotatable thereabout. In this way, by turning the shaft the smaller sections may selectively become situated in such a relation versus the larger ones that the periphery of all sections acquire a common tangent plane in view of an opposed surface. The opposed surface may be a xerographic drum or belt and the pressure roller, after applying a suitable electric DC potential to it, may serve as part of transfer device adapted for being used for the transfer of toner image towards a paper passing between the nip of the pressure roller and the xerographic drum or belt, whereby the effective width of the pressure roller is a function of the width of the paper.

13 Claims, 5 Drawing Figures

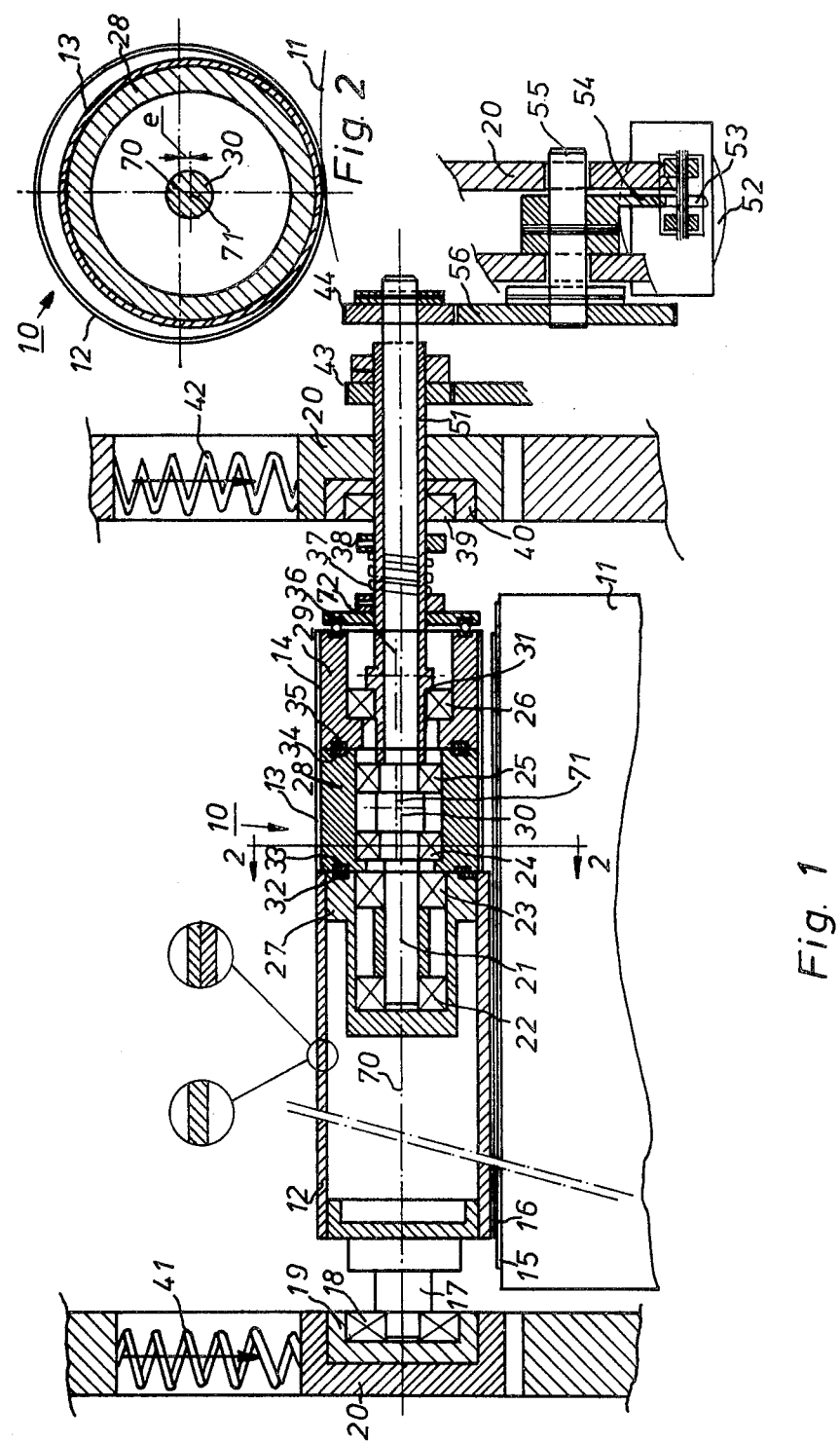

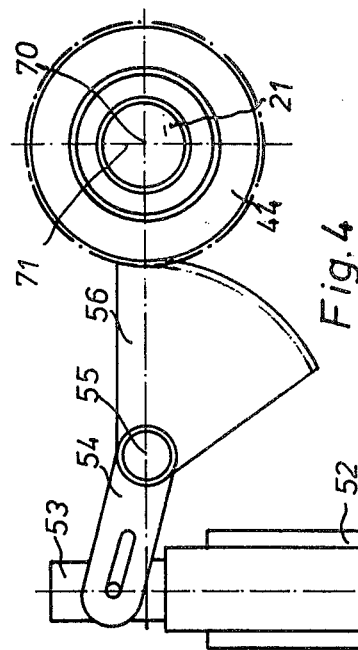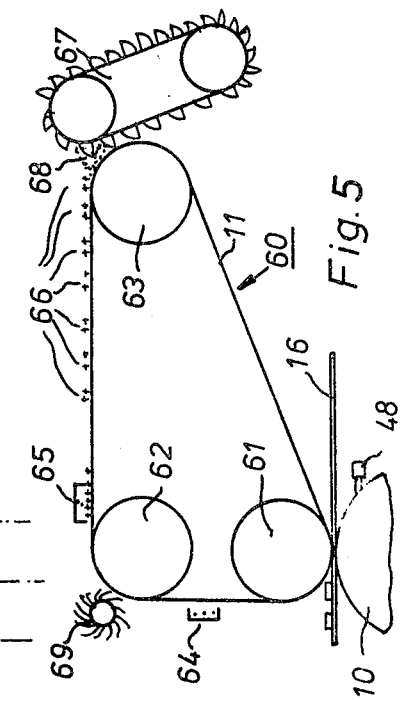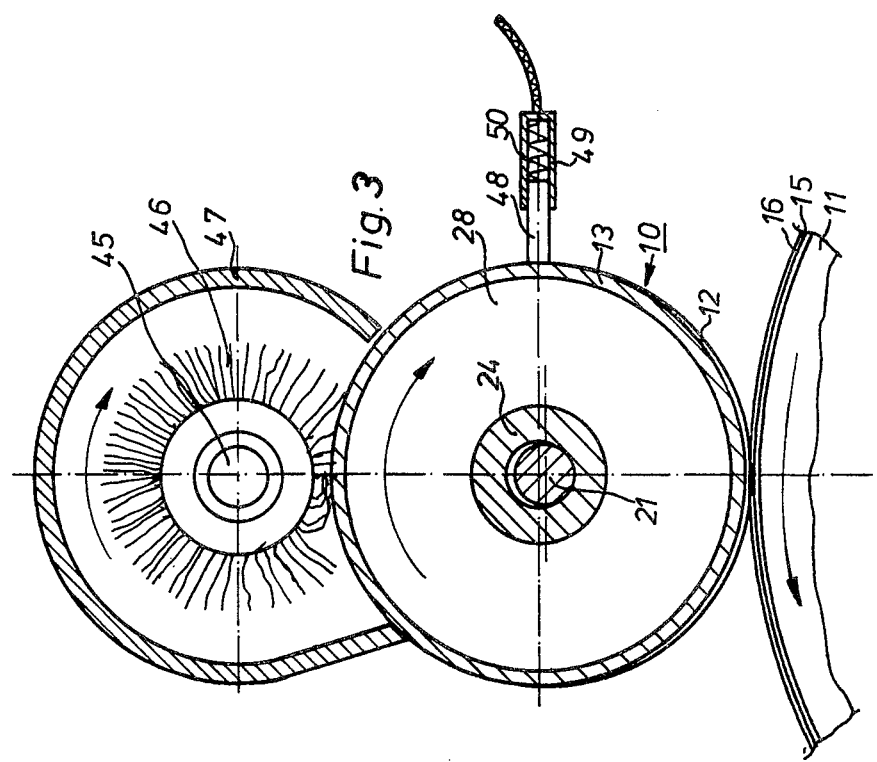

ROLLER WITH ADJUSTABLE LENGTH

This invention is concerned with rotatable pressure devices and more particularly with pressure means, the pressure length of which has to be adjustable as a function of the width of a sheet or weblike material being subjected to a pressing process.

The invention is of particular importance during the transfer step in a xerographic copying process during which the toner image adhering to a xerographic medium of constant width has to be transferred to a final support, generally in the form of a sheet of paper, the width of which is a function of the variety of paper sizes used in present day office work. The xerographic process, as firstly disclosed in U.S. Pat. No. 2,297,691 of Chester F. Carlson issued Oct. 6, 1942, makes use of an electrostatically charged photoconductor, which is exposed to a light and shadow pattern, permitting the electrostatic charge to flow away at the exposed areas, in this way creating a latent electrostatic image constituted by the residual charge at the areas which were not or only slightly light-struck.

This electrostatic latent image may be rendered visible with the help of a so-called toner/carrier mixture in which the toner particles by mutual friction with the carrier particles acquire an electrostatic charge of a sign opposite to that of the latent image and, consequently, are attracted by the latter.

The photoconductor may be either a flexible sheet on which a layer of a photoconductive substance has been coated, or a metallic drum or belt on which a layer of selenium has been applied by vacuum deposition.

The powder image must then be submitted to a fixing treatment in order to render it permanent.

In the case that the support is in the form of a sheet of paper, this may be done by heating the support, causing the melting of the resinous substances contained in the toner powder so that the latter becomes firmly bonded to the paper.

In the case that the photoconductor is in the form of a re-usable drum or belt onto which selenium or another photosensitive semi-conductor has been coated, the toner is first transferred to a final support (generally a sheet of paper) before undergoing the fixing process.

In xerographic copying apparatus of moderate capacity, that is to say, those working at a copying speed of about 15 to 20 copies per minute, the transfer may be carried out by contacting the sheet with the drum or belt while applying an electric field with the help of a corona generator. This electric field has to be of the same sign but of higher magnitude than that emanating from the drum, so that the toner particles are attracted by that field but are intercepted by the sheet of paper. The latter is then submitted to the fixing process.

In high speed copying apparatus, the time of contact between the paper and the selenium drum or belt drastically decreases by a factor of 2 or more in comparison with conventional apparatus. Consequently, the contact itself has to be of better quality and a transfer roller will be used which firmly presses the sheet of paper against the drum or belt. When an electric field is applied between that roller and the drum or belt the transfer is effected very quickly.

A problem which arises when such a transfer system is used, is that when the width of the support (i.e. its dimension normal to its direction of travel) is less than the corresponding dimension of the transfer roller and the xerographic drum or belt, there is inevitably a region or regions within the electrostatic field between the said roller and the said drum or belt where they are separated only by a distance equal to the thickness of the paper support but into which such support does not extend. In consequence electric discharge or breakdown between the said roller and the said drum or belt may occur, and result in damage to the vulnerable photosensitive coating.

An object of the invention now is to provide a rotatable pressure station the pressure length of which is adaptable to the width of the final support.

Another object of the invention is to provide a rotatable pressure station which enables a high electric potential to be applied between it and a photosensitive drum or belt during transfer.

According to the present invention there is provided a rotatable pressure means defining or adapted to define a working gap with an opposed surface, which pressure means is characterised in that it comprises roller sections mounted in end-to-end relationship for rotation about parallel axes at least one of which is displaceable parallel with itself so as to modify the profile of the said gap.

Preferably the diameters of the roller sections are such that the roller sections have a common tangent plane at one position around the pressure means. When the pressure means is in use, the peripheries of the rollers can then define with an opposed surface as aforesaid a working gap which is of uniform width over the length of the pressure means. By displacing the rotation axis of a roller section the gap can be widened over that portion of the length of the pressure means occupied by that roller section. Thus in the case of a xerographic copying apparatus, the effective length of the pressure means can be varied to suit paper sheets or other final image supports of different widths.

Preferably there is a roller section having a fixed rotation axis and at least one secondary roller section of the same or smaller diameter whose axis of rotation is displaceable, parallel with itself, relative to the said fixed rotation axis.

In presently preferred embodiments of the invention, the roller sections are freely rotatable roller sections, i.e., sections which are rotatable by frictional contact with a travelling sheet or web held in contact therewith.

Preferably the different roller sections are freely rotatably supported by a common normally stationary shaft, through bearings supported for rotation on surfaces which have parallel but mutually offset axes and such surfaces can be displaced in a way which involves angular displacement of the plane containing those axes. For example said shaft may have one or more eccentric surface portions carrying a bearing or bearings for one or more roller sections and/or may support an outer hollow shaft or sleeve having a bearing supporting surface portion which is eccentric with respect to the shaft. In such cases, displacement of the axis or axes of rotation of a roller section or roller sections can be achieved by turning the shaft about its axis and/or by turning said outer hollow shaft or sleeve relative to such shaft.

The invention includes pressure means with adjustable pressure length, comprising:

a roller assembly with a first roller section which is rotatable about a first shaft portion, at least one second roller section which is rotatable about a second shaft portion, the axis of said second shaft portion running parallel with but being off-set from the axis of said first shaft portion;

an opposed surface movable adjacent to said roller assembly for defining with said roller assembly a pressure assembly for a sheetlike material and means for angularly displacing at least one of said shaft portions with respect to the other, thereby to cause a relative displacement of said at least one roller section with respect to said movable surface in order to modify the profile of the gap between said roller assembly and said surface.

Preferably, but not necessarily, one or more roller sections is or are displaceable into a position in which the roller sections of the pressure means have, at the position around the periphery of the pressure means where it is nearest to said opposed surface, a common tangent plane. In a xerographic copying apparatus in which the roller assembly serves as transfer or backing roller the or each second roller section can then be displaced out of operative position in which it makes proper contact with the paper sheet or other final support of the xerographic image, into an inoperative position in which there is a larger gap between such second roller section and the xerographic belt or drum and the apparatus is better able to receive narrower sheets having a width catered for by the first roller section.

Preferably the or each roller section having a displaceable axis has a diameter equal to or smaller than a roller section with a fixed axis.

The scope and spirit of the invention will best be illustrated by the description of a preferred embodiment with reference to the accompanying drawings, in which:

FIG. 1 is a cross-sectional view in axial direction of a preferred embodiment of a rotatable pressure station according to the invention, FIG. 2 is cross-sectional view of the device of FIG. 1 according to the line 2-2, except that the small rubber section has been rotated 180°, FIG. 3 is a cross-sectional view of the device of FIG. 1 according to the line 2-2, during its use in the transfer station of a xerographic copying apparatus, FIG. 4 illustrates an embodiment of a mechanism by means of which the second roller sections may be partly rotated, and FIG. 5 shows the use of a rotatable pressure station according to the invention in combination with a photoconductive belt.

As may be seen in FIG. 1, a transfer roller 10 for being used in combination with a xerographic photosensitive drum or belt 11 is composed of a first roller section 12 and a plurality of second roller sections, in this case the sections 13 and 14. Although the second roller sections are represented as lying at the same end of the first roller section 12, it will be clear that one or more second roller sections could be provided at each end side of the first idler section. The idler sections 12, 13 and 14 are mounted for free rotation as hereafter described. The drum or belt 11 has a photosensitive coating 15. During copying a paper sheet 16, serving as final support for a xerographic toner image (not shown) adhering to the coating 15 by electrostatic forces passes between the transfer roller 10 and the said photosensitive coating. In order to facilitate the transfer of the xerographic toner image from the coating 15 to the paper 16, a DC-potential of high magnitude is applied to the first roller section 12 and to the second roller sections 13 and 14 (see FIG. 2).

In FIG. 1 a paper sheet 16 is shown which has a width substantially equal to the full length of the transfer roller 10. In such cases the paper sheet is an effective dielectric between the transfer roller and the drum or belt 11. Consequently the fact that the distance between the roller and such drum or belt is very small (equal to the thickness of the paper sheet) over the whole length of the transfer roller does not involve risk of electrical breakdown as hereinbefore referred to. However, if a narrower sheet is fed through and the same small gap between the transfer roller 10 and the drum or belt 11 existed over the full length of the transfer roller, such an electrical breakdown might occur in the region(s) of the gap where no paper is present. Such an electrical breakdown towards the photosensitive coating 15 might result in damage to the latter at such region(s).

In order to permit such risk of damage to be avoided, the transfer roller has been constructed so that roller section 14 or roller sections 13 and 14 can be radially displaced from positions in which they have a common tangent plane with roller section 12 in the plane occupied by the paper sheet 16, into the positions shown in FIG. 1a. In these illustrated positions, the magnitude of the electric field between the drum or belt 11 and the roller sections 13 and 14 is sufficiently low to avoid electrical breakdown through the air gap between them.

In a preferred embodiment of a rotatable pressure means according to the invention, each of the second roller sections 13 and 14 is moved from its inactive position into its working position and vice versa by means of associated eccentric mechanisms located inside such roller section.

At one of its ends, the first roller section 12 of the transfer roller 10 is provided with a trunnion 17, supported by a roller bearing 18, which is enclosed in a cup 19 of highly insulating material, located in a part of the frame 20 of a copying apparatus. At its other end the transfer roller 10 is supported by a shaft 21 through the intermediary of roller bearing sets 22 and 23 and a sleeve 27 rotatably carried thereby. The shaft 21 is supported in the frame 20 and is coupled to a mechanism which will later be described and by which the shaft 21 can be turned about axis 70. The bearing sets 22 and 23 and the sleeve 27 have a common axis which is coincident with axis 70. The roller section 13 is supported through sleeve 28 and bearing sets 24,25 on a portion of shaft 21 which is eccentric with respect to the axis 70. Roller section 13 rotates about axis 71. By turning shaft 21 through 180° about its axis 70, roller section 13 can be radially displaced from its illustrated inactive position, into its active position in which at the position of the gap between the transfer roller 10 and the drum or belt 11, such roller section 13 has the same tangent plane as roller section 12.

The roller section 14 is supported through sleeve 29 and bearing set 26 on a further sleeve 51. The portion 31 of the sleeve 51 on which the bearing set 26 is carried is eccentric with respect to the axis 70 of the shaft 21. A mechanism analogous to that employed for turning the shaft 21 is provided for turning the sleeve 51. By this means roller section 14 can be radially displaced on its own, into inactive position so that the apparatus is suitable for receiving sheets 16 whose width is substantially equal to the combined lengths of roller sections 12 and 13. Alternatively both roller sections 13 and 14 can be radially displaced into inactive positions when narrower sheets are to be fed through.

At the joints between the sleeve 27, 28 and 28, 29, rings 32,33 and 34,35 are provided respectively. These rings are made of a material which has a relatively low coefficient of friction, preferably polytetrafluoroethylene, sold under the trade-name TEFLON (TEFLON is a registered trademrk of E.I. Dupont de Nemours, Wilmington - Delaware, U.S.A.) in order to reduce friction between the sleeves when only one or two of them is in operative position and thus rotated by contact between the paper sheet and the corresponding roller sections. In order to keep the different roller sections in juxtaposition, a spring 37 is provided which is located between a ring 38 fixed on the shaft 21 and a thrust bearing 36. The shaft 21 carries another roller bearing 39 located in the cup 40 of highly insulating material enclosed by the frame 20.

By means of springs 41 and 42 a pressure is exerted on the cups 19 and 40 which house the bearings 18 and 39, so that a pressure may be established between the roller 10 and the photoconductive drum or belt 11. Those skilled in the art will appreciate that in order to keep the second roller sections 13 and 14 in their desired position, the magnitude of the axial pressure exerted by the spring 37 has to exceed the magnitude of the pressure exerted by the springs 41 and 42.

On the shaft 21 and the sleeve 51 are provided gear wheels 44 and 43 respectively, in order to be connected to a mechanism that is capable to cause an angular displacement of said elements. Details and the description of the mechanism may be found in the course of the following description.

FIG. 2 shows a cross-sectional view of the roller 10 of FIG. 1 according to the line 2-2' when both the first roller section 12 and the second roller section 13 are in tangent relationship with the xerographic drum or belt 11. By the fact that the diameter difference between the roller sections 12 and 13 is exactly equal to two times the distance e (e being the eccentricity), their correct tangent alignment with the drum or belt 11 is guaranteed. When the difference between the diameters of the first and second roller sections is less than that distance, thereby assuming that the second roller section is the smallest one, no contact between the latter and the drum or belt 11 may be established anymore. On the contrary, when the difference in diameters exceeds that particular value of two times the distance e, no further alignment of the tangent areas as stated in the foregoing is still possible.

In FIG. 3 is illustrated how a transfer roller 10 may be used in practice in combination with a xerographic drum 11 and a cleaning device 45, 46, 47, of compact structure.

The transfer roller 10 rotates freely by effect of the friction exerted by the drum 11 onto the first roller section 12. The eccentric part 30 on shaft 21 being in upward direction, the second roller section 13 stays out of contact with the drum 11. An electric field is applied between the drum 11 and the roller 10 by means of an electrode 48 which is in sliding contact with it. In the embodiment illustrated, the electrode 48 is urged against the roller 10 with the help of a spring 49, located in housing 50 and is connected by means of a cable to a suitable source of DC-voltage (not shown). It is apparent that instead of a sliding contact as shown, also other types of devices for making a contact for example a roller may be used.

The transfer roller 10 is continuously cleaned by means of a rotating brush 46, mounted upon a shaft 45. The brush removes toner powder particles which might adhere to the roller 10 and which could otherwise be transferred to the next coming sheet of paper 16 so being the cause of marks upon the latter. The brush 46 is conveniently surrounded by a screen 47 which prevents that sucb toner particles would be projected into the interior of the copying apparatus.

FIG. 4 shows an embodiment of the mechanism for bringing part of the periphery of the second roller 13 and that of the first roller section 12 in close contact with the photo-sensitive drum or belt 11 (see also FIG. 2).

As already described hereinbefore, the shaft 21 carries a gear wheel 44 which is capable to perform a partial rotation in order to cause an angular displacement of the second roller section 13. The partial rotation of the gear wheel 44 is occasioned by the fact that a cogged sector 56, rotating around a shaft 55 is in intermeshing relation with it. Once that the electromagnet 52 is energized, the yoke 53 exerts a pulling action on the arm 54 which is fixedly secured to the shaft 55, so that the sector 56 is partially rotated. In this way, the gear wheel 44 rotates and drives the shaft 21 so that the second roller section 13 (see FIG. 2) fitted thereon acquires a downward direction by effect of the eccentricity of axis 71 versus axis 70.

The analogous mechanism for turning the sleeve 51 (FIG. 1.) comprises a gear wheel 43 mounted on that sleeve.

Finally, in FIG. 5 is given a diagrammatical view of a xerographic copying apparatus 60 in which toner transfer from the xerographic belt 11 towards the paper sheet 16 is performed with the help of transfer roller 10 brought to a suitable electric DC-potential by means of the sliding contact 48. The steps required to perform a copying cycle with an apparatus of this design are: the uniform charging of the belt 11 with the help of a DC-corotron 65, the exposure (not shown) creating an electrostatic latent image 66 which is made visible by means of a toner/carrier mixture 68 delivered by for example a so-called dredging device 67. At this stage, the toner particles are attracted to the photoconducting xerographic belt 11 by the change of electrostatic latent image thereon and remain adhered thereto. The so-formed tone image is then transferred to the paper sheet 16, which processing is optimized by means of the transfer roller 10. The xerographic belt 11 is then passed along an AC-corotron 64 restoring its initial zero charge condition and subjected to the action of a cleaning brush 69 by means of which toner particles which might still adhere to the xerographic belt 11 are removed.

The xerographic belt 11 itself is suspended with the help of rollers 61, 62, and 63.

After the transfer stage, the paper sheet 16, now bearing a toner image is transferred to a fixing station (not shown) in order to render the toner image permanent. Although in the foregoing descripton, the transfer roller 10 has been described in connection with its incorporation into a copying apparatus, this is not a limitative embodiment and the scope and spirit of the invention shall be derived from the appended claims.

We claim:

1. An adjustable rotatable pressure roller comprising a support shaft, a main roller section and at least one axially juxtaposed auxiliary roller section supported on said shaft, said auxiliary roller section having a diameter less than that of said main roller section, and adjustable means for bodily displacing said auxiliary roller section radially upon said shaft to adjust the position of its axis of rotation in parallel relation to the position of the axis of rotation of said main roller section.

2. A rotatable pressure means according to claim 1, wherein the roller sections are freely rotatably supported on said shaft through bearings supported for rotation on surfaces which have parallel but mutually offset axes and such supporting surfaces can be displaced to vary the extent of offset of said axes.

3. An adjustable rotatable pressure roller comprising:
a common supporting shaft,
a roller assembly having a first roller section which is rotatable about a first shaft portion, and at least one second roller section which is rotatable about a second shaft portion and of smaller diameter than said first roller, the axis of rotation of said second roller section about said second shaft portion extending in offset parallel relation to the axis of rotation of said first roller section about said first shaft portion,
an opposed movable surface adjacent to said roller assembly for defining with said roller assembly a pressure nip for the passage therethrough of a sheetlike material, and
means for angularly displacing said shaft portions to vary the extent of said offset axial relation, thereby to cause a relative bodily displcement of said second roller section with respect to said opposed surface in order to modify the profile of the gap therebetween said roller assembly and said opposed surface.

4. A rotatable pressure means according to claim 3, wherein said opposed surface is formed by the peripheral surface of a roller having a length which equals at least that of the assembly of roller sections.

5. A rotatable pressure means according to claim 3, wherein said opposed surface is formed by an endless belt having a width which equals at least the length of the assembly of roller sections.

6. A rotatable pressure means according to claim 3, in which said roller sections are made of a highly electroconductive material.

7. A rotatable pressure means according to claim 3, in which said roller sections are made of an insulating material on which a layer of a highly electroconductive material is provided.

8. A rotatable pressure means according to claim 3, including means for applying an electric DC-potential to said roller sections.

9. A rotatable pressure means according to claim 3, in which friction reducing means are provided between said roller sections.

10. A rotatable pressure means according to claim 3, in which said pressure means is at a transfer station of an electrostatic copying apparatus, said opposed surface is a continuous xerographic member, and a source of DC-potential is connected to the surface of said roller assembly.

11. A rotaable pressure means according to claim 10, in which there is also provided brush means partly surrounded by a screen in order to remove xerographic toner powder particles which might adhere to the surface of said roller assembly.

12. A rotatable pressure means according to claim 11, in which said brush means is in the form of a cylindrically shaped brush, carried by a shaft and rotating in the same direction as the rotation of said roller assembly.

13. A rotatable pressure means according to claim 3, wherein a source of DC-potential applies a DC-potential to the surface of said roller assembly with the help of a sliding contact resiliently urged against said roller assembly.

* * * * *

UNITED STATES PATENT OFFICE
CERTIFICATE OF CORRECTION

Patent No. 4,099,487        Dated July 11, 1978

Inventor(s) Albert Paul Wouters

It is certified that error appears in the above-identified patent and that said Letters Patent are hereby corrected as shown below:

Column 7, line 28, "displcement" should read -- displacement --;

line 31, "therebetween" should read -- between --.

Signed and Sealed this

Fifth Day of December 1978

[SEAL]

Attest:

RUTH C. MASON
Attesting Officer

DONALD W. BANNER
Commissioner of Patents and Trademarks